United States Patent [19]
Luch et al.

[11] Patent Number: 5,348,183
[45] Date of Patent: * Sep. 20, 1994

[54] TAMPER-EVIDENT, INITIALLY UNITARY, FITMENT AND CLOSURE

[75] Inventors: Daniel Luch, Los Gatos; Brian M. Adams; Rawson Chenault, both of Newark, all of Calif.

[73] Assignee: Portola Packaging, Inc., San Jose, Calif.

[*] Notice: The portion of the term of this patent subsequent to Apr. 19, 2011 has been disclaimed.

[21] Appl. No.: 939,838

[22] Filed: Sep. 2, 1992

Related U.S. Application Data

[63] Continuation of Ser. No. 771,057, Oct. 2, 1991, abandoned, which is a continuation-in-part of Ser. No. 664,658, Mar. 5, 1991, abandoned.

[51] Int. Cl.$^5$ .................................................. B65D 51/18
[52] U.S. Cl. .................................... 220/256; 220/254; 220/265; 220/276; 220/307; 215/253; 222/541; 229/125.15
[58] Field of Search ............... 220/233, 254, 256, 265, 220/266, 276, 281, 307, 323, 359, 375; 215/253, 258; 222/541, 153; 229/125.15, 125.17

[56] References Cited

U.S. PATENT DOCUMENTS

| | | | |
|---|---|---|---|
| 3,083,858 | 4/1963 | Biedenstein | 220/265 |
| 3,187,966 | 6/1965 | Klygis | 220/265 X |
| 3,608,771 | 9/1971 | Monroe et al. | 220/266 |
| 3,966,080 | 6/1976 | Bittel | 220/269 |
| 3,998,354 | 12/1976 | Song | 220/269 |
| 4,149,651 | 4/1979 | Ignell | 220/265 |
| 4,231,486 | 11/1980 | Bock | 220/266 |
| 4,308,969 | 1/1982 | Heisler et al. | 220/266 |
| 4,572,385 | 2/1986 | Luker | 215/216 |
| 4,630,743 | 12/1986 | Wright | 215/216 |
| 4,669,640 | 6/1987 | Ando et al. | 220/276 X |
| 4,785,963 | 11/1988 | Magley | 220/266 |
| 5,020,686 | 6/1991 | Dutt | 220/276 |
| 5,076,493 | 12/1991 | Anderson | 229/125.15 |

FOREIGN PATENT DOCUMENTS

WO90/03919  4/1990  PCT Int'l Appl. ............ B65B 3/06

*Primary Examiner*—Allan N. Shoap
*Assistant Examiner*—Vanessa Caretto
*Attorney, Agent, or Firm*—Julian Caplan

[57] ABSTRACT

A fitment for a container, such as a carton, has an attachment flange adapted to be sealed to the carton around a pour hole therein. The fitment has a cylindrical spout formed with vertically spaced seal bead and locking bead. The closure has a top disk with a depending skirt dimensioned to slidably fit within the spout. The exterior of the skirt has an external locking bead at its lower end positioned to lock under the fitment locking bead to hold the closure in place and a seal surface to be engaged by the fitment seal bead. Initially the fitment and spout are molded as a unit, the locking bead of the closure and the top edge of the fitment spout being joined by a circular frangible link. The combination is tamper-evident since access to the interior of the carton cannot be obtained without breaking the link. As an alternative, the cap may be separated from the spout and slid inside the spout. Separate cooperable means on the cap disk and fitment flange make this alternative tamper-evident.

14 Claims, 2 Drawing Sheets

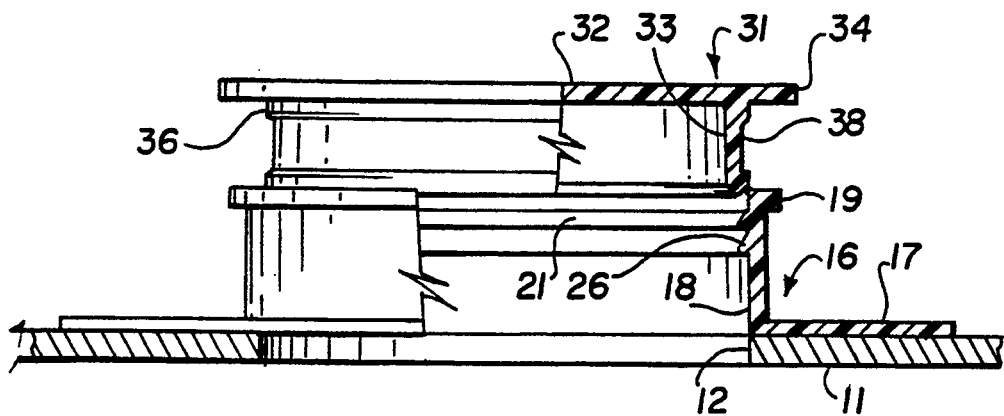
Fig.1
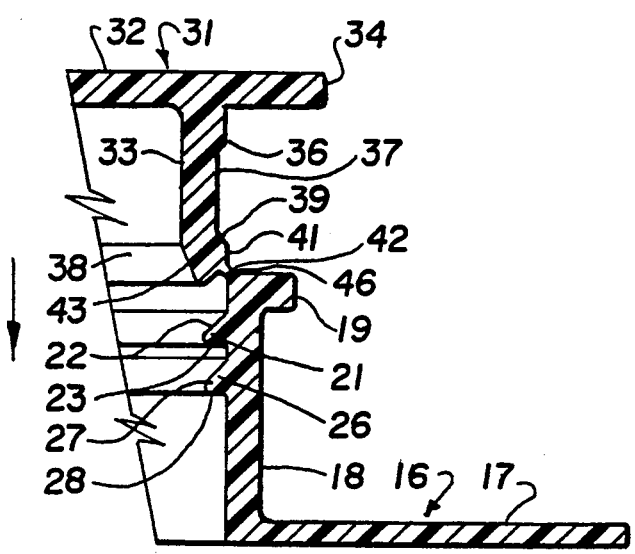
Fig.2
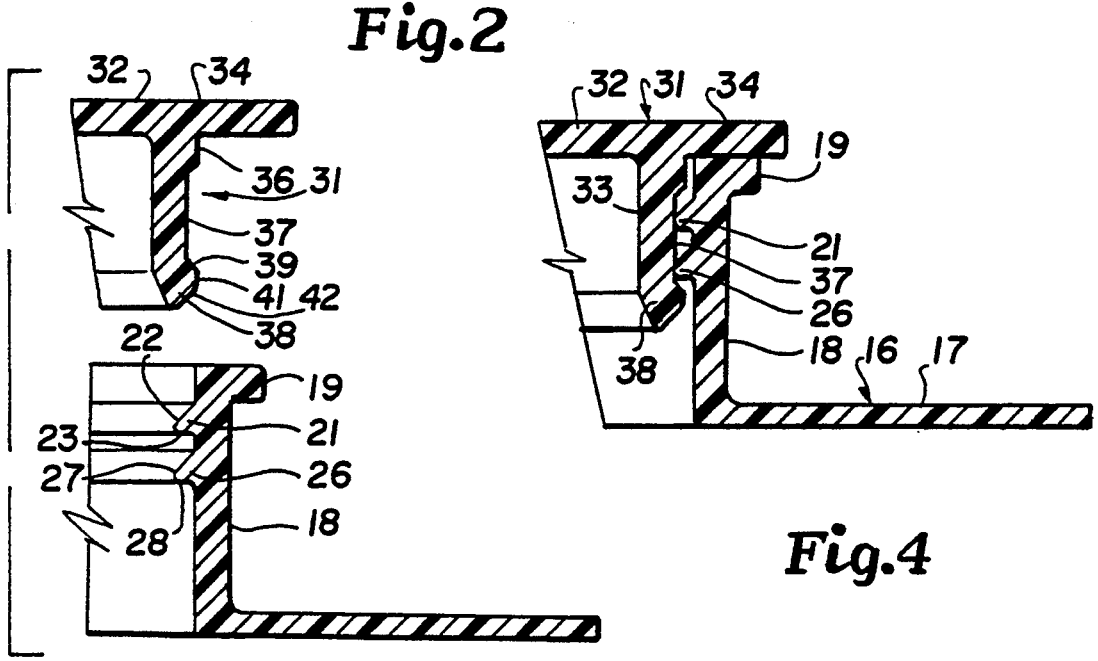
Fig.3
Fig.4

TAMPER-EVIDENT, INITIALLY UNITARY, FITMENT AND CLOSURE

CROSS-REFERENCE TO RELATED APPLICATION

This is a continuation of application Ser. No. 07/771,057 filed Oct. 2, 1991, now abandoned, which is a continuation-in-part of copending U.S. patent application Ser. No. 07/664,658, filed Mar. 5, 1991, now abandoned.

BACKGROUND OF THE INVENTION

1. Field of the Invention

This invention relates to a new and improved tamper-evident fitment and closure characterized by the fact that initially the fitment and closure are molded together.

2. Description of Related Art

The related art in fitments and closures therefor is discussed in detail in the aforesaid U.S. patent application Ser. No. 07/664,658. The present invention is an improvement on certain of the modifications shown in the aforesaid patent application to improve the sealing thereof and, further, to provide tamper-evident means where the closure is separated from the fitment either during initial opening by the consumer or prior to attachment to the container.

SUMMARY OF THE INVENTION

A fitment to be attached to a container has a pouring spout formed with locking and sealing internal beads. The closure has a top disk with a depending skirt. Initially the fitment and closure are molded as a single unitary member, the two parts being joined together by a frangible circular link. The link may be broken by pushing down on the closure, whereupon a skirt which depends from the top disk of the closure slides inside the spout of the fitment. Cooperating locking beads on the skirt and spout hold the closure in closed position. Further, a sealing bead on the inside of the spout seals against the sealing surface of the skirt.

So long as the cap and spout are in their initial molded position and the frangible link connecting them is intact, the spout and closure are tamper-evident. However, in a modification of the invention, the frangible link may be broken and the closure inserted in the fitment at the factory. To make the latter preassembled version tamper-evident, cooperating means on the closure and fitment are employed.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1 is a fragmentary side elevational view partly broken away in section to reveal internal construction.

FIG. 2 is an enlarged sectional view of a portion of FIG. 1.

FIG. 3 is a an exploded view showing separation of the closure and fitment of FIG. 2.

FIG. 4 is a fragmentary sectional view showing the closure applied to the fitment.

DETAILED DESCRIPTION OF THE PREFERRED EMBODIMENTS

Figure 5:
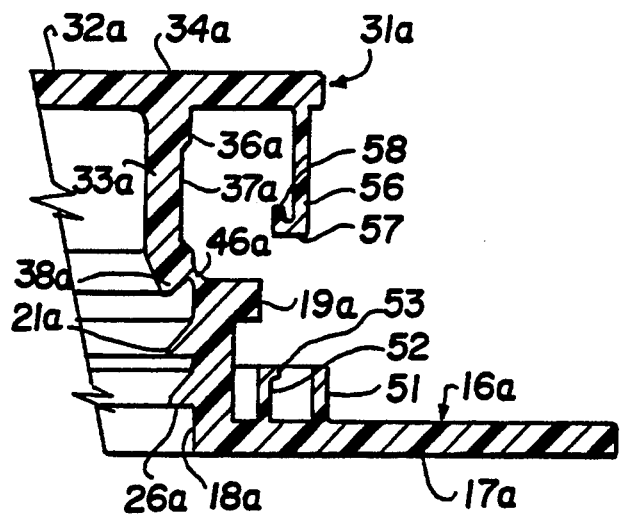
FIG. 5 is a view similar to FIG. 2 of a modification.

Reference will now be made in detail to the preferred embodiments of the invention, examples of which are illustrated in the accompanying drawings. While the invention will be described in conjunction with the preferred embodiments, it will be understood that they are not intended to limit the invention to those embodiments. On the contrary, the invention is intended to cover alternatives, modifications and equivalents, which may be included within the spirit and scope of the invention as defined by the appended claims.

The present invention is adaptable to a number of uses but the preferred embodiment is the attachment of the fitment to the carton wall 11 formed with hole 12 through which the contents of the carton may be poured. It will be understood that the invention is adapted to other constructions.

Fitment 16 is formed with an attachment flange 17 having an inside diameter approximately that of the hole 12 and a sufficiently large outside diameter so that the flange 17 may be attached to the panel 11 by various means such as use of an adhesive, ultrasonic or heat welding. Extending upward from the inner edge of flange 17 is spout 18 which may have an external flange 19 at its upper edge. The inside of spout 18 is cylindrical. Adjacent its upper edge is internal seal bead 21. The preferred shape of bead 21 is best shown in FIG. 2 wherein it will be seen that the top surface of bead 21 slants downward-inward at an angle of approximately 60° to the horizontal and that there is a horizontal shoulder 23 on the underside of surface 22. Below bead 21 is a locking bead 26 which also has a downward-inward top slanted surface 27 and a shoulder 28.

Closure 31 is preferably initially molded with the fitment 16. Closure 31 has a top disk 32 from which depends a cylindrical skirt 33. Extending outward beyond skirt 33, disk 32 has a flange 34, the outer diameter of which is greater than that of flange 19. Immediately below disk 32 the exterior of skirt 33 is formed with a thin collar 36. Below collar 36 is a sealing surface 37 against which the seal bead 21 seals. If the closure and fitment are molded as a single member, the surface 37 must be molded by split mold which may leave a mold parting line on the surface 37. Accordingly, it is important that the bead 21 be sufficiently flexible to seal against the surface 37. At the bottom of skirt 33 is an external locking bead 38 which has a downwardly-outwardly slanted top surface 39, a substantially vertical outer surface 41, and a downwardly-inwardly slanted bottom surface 42. The inner lower edge of bead 38 may be formed with a chamfer 43.

In a preferred embodiment of the invention, the fitment 16 and closure 31 are molded as a unitary part and are connected by a circular, frangible link 46 which joins surface 42 and the upper inner corner of spout 18.

If the fitment 16 is attached to the panel 11 with the closure 31 in the position shown in FIGS. 1 and 2, the arrangement is tamper-evident since so long as the link 46 is intact, there is assurance that no one has tampered with the contents of the container. The consumer separates the closure 31 from the fitment 16 by pulling it away or pushing it in and dispenses part of the contents of the container. Thereupon, for reclosure purposes, the closure 31 may be pushed down on the fitment 16 to the position shown in FIG. 4. The container is substantially spill-proof in the condition of FIG. 4. The consumer may reopen the container by pulling upward on the flange 34.

Figure 6:
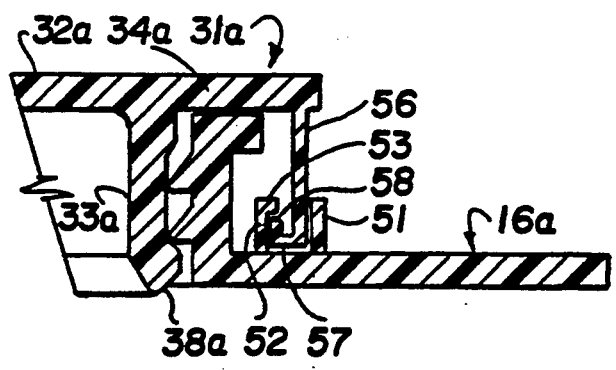
FIG. 6 is a view similar to FIG. 4 of the modification of FIG. 5.

Directing attention now to the modifications shown in FIGS. 5 and 6, the parts are molded in the condition shown in FIG. 5. However, the closure 31a is separated from the fitment 16a at the factory and pre-assembled in the condition shown in FIG. 6.

In the modification of FIG. 5 it can be seen that there is an outer wall 51 upstanding from the flange 17a and an inner wall 52. The upper edge of wall 52 is formed with an outward turned lip 53. The closure 31 is formed with a depending outer leg 56 having an in-turned flange 57 at its bottom edge formed with an upstanding lip 58. When the parts are preassembled as shown in FIG. 6, the lower end of the leg 56 fits between the walls 51, 52. The lips 53 and 58 interlock. So long as the parts are in the position shown in FIG. 6, the combination is tamper-evident. In order to remove the closure 31a, the parts must be separated and the interfitting lips 53, 58 prevent such separation without leaving visible evidence that the closure has been removed. The consumer opens the container by fracturing leg 56 or lips 53 or 58.

In many respects shown in FIGS. 5 and 6 resemble those of the preceding modification and the same reference numerals followed by subscript a are used to designate corresponding parts.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. An intermediate product comprising an initially unitary fitment and closure combination, said fitment having a spout having an interior and an exterior and a peripheral attachment means extending outward from vicinal a lower end of said spout, said attachment means comprising an annular flange for attaching said fitment to an apertured container, said closure having a top and a cylindrical skirt having an interior and an exterior depending from said top dimensioned to fit within spout, cooperating seal means on said spout and said skirt to seal said spout and said skirt to each other in assembled condition and frangible means joining said skirt to an upper end of said spout, a first tamper-evidencing means on said attachment means and second tamper-evidencing means on said closure engageable with said first tamper-evidencing means, said first and second tamper-evidencing means having first and second inter-engaging means, respectively, which interengage so that said fitment and said closure cannot be separated after assembly without rupturing one of said tamper-evidencing means to provide visual evidence of tampering.

2. The combination of claim 1 in which said seal means comprises a wall on the exterior of said skirt and a bead on the interior of said spout bearing against said wall.

3. The combination of claim 1 which further comprises a first locking bead having an underside on the interior of said spout and a second locking bead on the exterior of said skirt dimensioned to engage said underside of said first locking bead when said closure is seated on said fitment to restrain unintentional separation of said closure and said fitment.

4. The combination of claim 1 in which said top has a second flange larger than the interior of said spout to limit said closure from sliding completely within said spout.

5. An initially unitary fitment and closure combination, said fitment having a spout having an interior and an exterior and attachment means for attaching said fitment to an apertured container, said closure having a top and cylindrical skirt having an interior and an exterior depending from said top dimensioned to fit within said spout, cooperating seal means on said spout and said skirt to seal said spout and skirt to each other in assembled condition and frangible means joining said skirt to the upper end of said spout, a first tamper-evidencing means on said attachment means and second tamper-evidencing means on said closure engageable with said first tamper-evidencing means, said first and second tamper-evidencing means having first and second inter-engaging means, respectively, which interengage so that said fitment and said closure cannot be separated after assembly without rupturing one of said tamper-evidencing means to provide visual evidence of tampering, said attachment means comprising an annular attachment flange around said spoilt, said attachment means having an upper surface, said first inter-engaging means comprising at least two upstanding walls on said upper surface of said attachment means and a first lip on one of said walls, and said second inter-engaging means comprising a depending leg having a lower end outside said skirt depending from said top and a second lip on said lower end of said leg, said leg being positioned and dimensioned to fit between said walls, said lips inter-engaging.

6. In combination, a fitment and a closure,
    said fitment comprising a spout, a peripheral attachment means extending outward from vicinal a lower end of said spout, said attachment means comprising an annular flange for attaching said fitment to a container surrounding an aperture in said container,
    said closure having a top, a cylindrical skirt having an exterior wall depending from said top dimensioned to fit within said spout,
    cooperating seal means on said spout and said skirt to seal said fitment to said closure in assembled condition,
    first tamper-evidencing means on said attachment means, second tamper evidencing means on said closure, at least one of said tamper-evidencing means being frangible, said first and second tamper-evidencing means being inter-engaged in the assembled condition of said fitment and said closure with said skirt seated within said spout to restrain removal of said closure from said spout so long as both said tamper-evidencing means are intact.

7. The combination of claim 6 in which said cooperating seal means comprises at least one of circumferential seal bead on an interior wall of said spout positioned to engage an exterior wall of said skirt.

8. The combination of claim 6 in which said fitment and said closure are initially a unitary plastic molded member and which further comprises a frangible connection between an upper end of said spout and said exterior wall of said skirt, said connection comprising a gate for flow of molten plastic.

9. The combination of claim 6 in which said first tamper-evidencing means comprises a first member extending upward from said flange and a second member extending from said first member spaced from and substantially parallel to said flange, and said second tamper-evidencing means comprises a third member extending downward from said closure and a fourth member on a distal end of said third member positioned to hook under said second member.

10. The combination of claim 6 which further comprises a first looking bead on the interior of said spout and a second locking bead on the exterior of said skirt dimensioned to engage an underside of said first locking bead when laid closure is seated on said fitment to restrain unintentional separation of said closure and said fitment.

11. The combination of claim 6 in which said closure has a second flange larger than the interior of said spout to limit said closure from sliding completely within said spout.

12. An intermediate product comprising an initially unitary fitment and closure combination, said fitment having a spout having a spout interior and a spout exterior and peripheral attachment means extending outward from said spout exterior vicinal a lower end of said spout, said attachment means comprising an annular flange for attaching said fitment to a container surrounding an aperture in said container, said closure having a top, a cylindrical skirt depending from said top having a skin exterior dimensioned to fit within said spout, a first seal portion on said skin exterior, a second seal portion on said spout interior, said second seal portion being smaller in circumference than said first seal portion, said first and second seal portions comprising seal means to seal said skirt to said spout when said skirt has been inserted inside said spout, said first seal portion comprising an elongated cylindrical surface.

13. A product according to claim 12 in which said skirt exterior is formed with a first portion above said cylindrical surface of a diameter larger than said cylindrical surface and a second portion below said cylindrical surface of a diameter larger than said cylindrical surface.

14. A product according to claim 12 in which said second seal portion comprises at least one internally directed bead.

* * * * *